United States Patent [19]
Beekman

[11] Patent Number: 4,856,833
[45] Date of Patent: Aug. 15, 1989

[54] BUMPER

[75] Inventor: Arie W. Beekman, Schinnen, Netherlands

[73] Assignee: Stamicarbon B.V., AC Geleen, Netherlands

[21] Appl. No.: 42,368

[22] Filed: Apr. 24, 1987

[51] Int. Cl.$^4$ .............................................. B60R 19/03
[52] U.S. Cl. ...................................... 293/120; 293/102
[58] Field of Search ............... 293/102, 109, 110, 120, 293/122, 132; 267/139, 140

[56] References Cited

U.S. PATENT DOCUMENTS

| | | | |
|---|---|---|---|
| 3,997,207 | 12/1976 | Norlin | 293/122 X |
| 4,076,296 | 2/1978 | Ditto et al. | 293/122 |
| 4,165,113 | 8/1979 | Casse | 293/120 X |
| 4,533,166 | 8/1985 | Stokes | 293/120 |
| 4,635,981 | 1/1987 | Friton | 293/110 |

Primary Examiner—Robert B. Reeves
Assistant Examiner—Russell D. Stormer
Attorney, Agent, or Firm—Cushman, Darby & Cushman

[57] ABSTRACT

The invention relates to a bumper comprising a bearing member and an elastic deformable plastic element provided with an impact surface, which element substantially consists of a number of interconnected box-shaped formations, the cross sections of which are regular polygons having an even number of sides and the center lines of which are parallel to the impact surface in which near the midpoints of two opposite sides the box-shaped formations are connected with each other and with the impact surface by connecting webs extending lengthwise along the box-shaped formations perpendicular to the impact surface and to the said sides. The choice of the locations for the interconnecting webs results in a relatively high elastic deformation of the element.

6 Claims, 3 Drawing Sheets

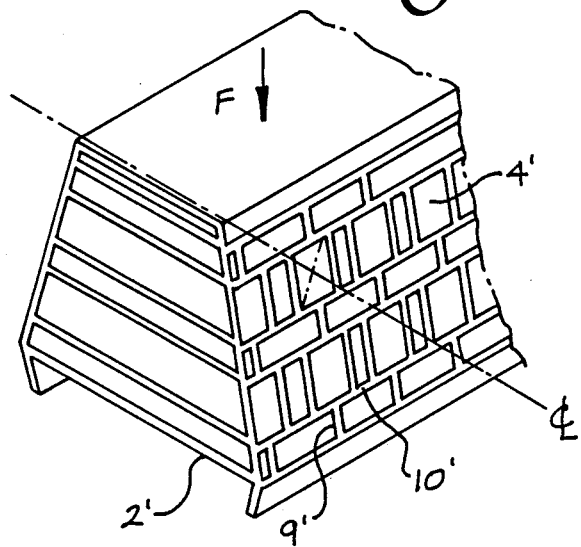

BUMPER

The invention relates to a bumper comprising a bearing member and an elastic deformable plastic element provided with an impact surface, which element substantially consists of a number of interconnected box-shaped formations the cross sections of which are regular polygons having an even number of sides and the centre lines of which are parallel to the impact surface.

Such a bumper is known from GB-A-No. 1 572 736. The bumper known in the art consists of a bearing member and a deformable element with a honeycomb structure from an elastomeric material. The edges of the prismatic (hollow) formations from which the element known in the art can be thought of as having been built up proceed in a direction perpendicular to the direction in which the element is normally put under load.

The disadvantage of the known bumper or of the deformable element thereof is that such degression is present in the overall deformation resistance as to allow the deformational force (load) to shift over a relatively large distance. Such disadvantage weights very heavily particularly with a bumper for a motor car. The fact is that in this field of application the dimensions desired from a technical viewpoint often exceed the dimensions which the designer deems permissible from an easthetical point of view.

Moreover, in the bumper known in the art a permanent deformation of the elastic element will occur at a relatively low impact velocity. The object of the invention is to provide a bumper that does not have the above-mentioned disadvantages.

The bumper according to the invention is characterized in that near the mid-points of two opposite sides the box-shaped formations are connected with each other and with the impact surface by connecting webs extending lengthwise along the box-shaped formations perpendicular to the impact surface and to the said sides. The choice of the locations for the interconnecting webs results in a relatively high elastic deformation of the element.

An embodiment of the bumper according to the invention is characterized in that the box-shaped formations have a virtually rectangular cross section. In this embodiment the elongation of the material of the box-shaped formation is very evenly distributed over the circumference thereof so that, up to a certain deformation, there will be a complete springback subsequent to the deformation. 'Virtually rectangular' is also deemed to comprise, for instance, a box-shaped formation the sides of which are slightly curved.

Another embodiment of the bumper according to the invention is characterized in that in planes perpendicular to those of the connecting webs the opposite edges of the box-shaped formations are connected by transverse webs. This eliminates lateral buckling in case of a relatively strong depression and/or a relatively large number of box-shaped formations arranged 'in series'.

An embodiment of the bumper according to the invention comprises relatively short box-shaped formations, the centre lines of which extend in a direction perpendicular to the direction of the bearing member.

The invention will be elucidated with reference to a number of figures. The invention is, of course, not limited to the embodiments represented. In the figures FIG. 1 is a diagrammatic representation of a complete bumper, with arrow F indicating the direction of load;

FIG. 4 is a diagrammatical representation of a bumper wherein the box-shaped formations extend in a direction perpendicular to the direction of those shown in FIG. 1.

Figure 1:
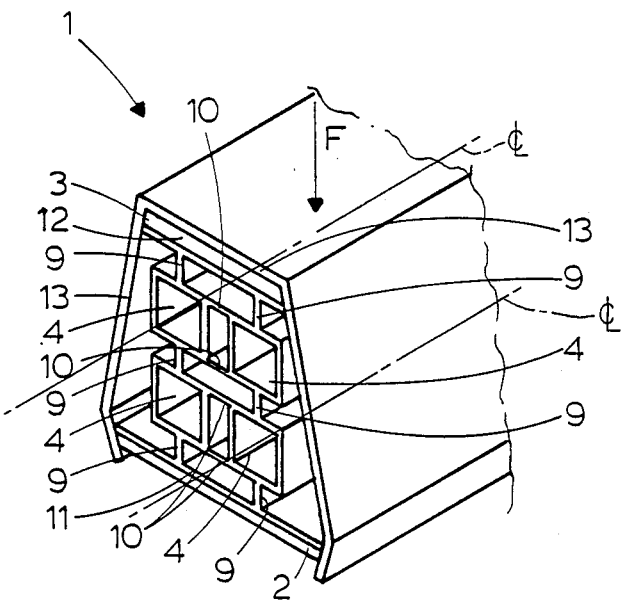

In FIG. 1, 1 indicates a bumper according to the invention that includes a bearing member 2, an impact surface 3 and a number of box-shaped formations 4. The embodiment represented comprises box-shaped formations with square cross sections. Depending on the elastic properties desired in connection with, for instance, the desired progression of the spring stiffness of the element, a different rectangular shape may be chosen for the cross section and the distances between the box-shaped formations, which are defined by the widths of connecting webs 9 and transverse webs 10, can be brought in line. Reference numerals 5 and 6 indicate two opposite sides of adjacent box-shaped formations 4, and connecting webs 9 connect the midpoints of these sides as at 7 and 8 (see FIG. 2). Numeral 11 represents a plastic bottom plate of the elastic element, which is secured to bearing member 2. A layer of foam 12 can be applied between impact surface 3 and case 13. Surfaces 13 jointly form a case as it were of the plastic element. This case is movable in respect of bearing member 2. Mostly the case will be given a certain aesthetical shape by the designer of the bumper, depending on the specific use.

Figure 2:
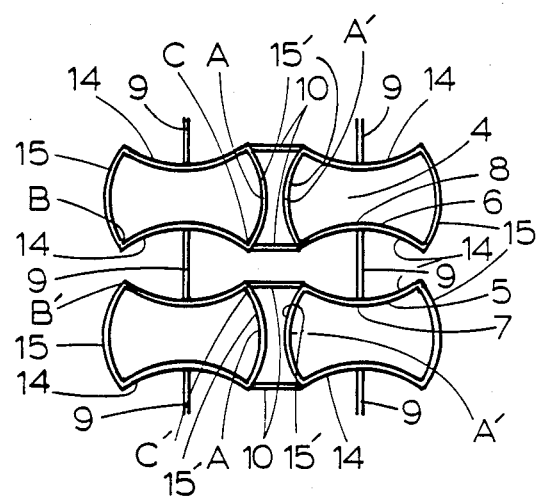
FIG. 2 is a represenation of a detail of the elastic deformable element in a deformed state.

In FIG. 2 a number of box-shaped formations are represented in a deformed state. The figures in this FIGURE otherwise have the sme meaning as in FIG. 1 if indicated therein. The load excercised on case 13 (indicated by arrow F in FIG. 1) is passed on via a possible intermediate layer 12 to impact surface 3 of the bumper and to the connecting webs 9. This will cause walls 14 of the box-shaped formations to become slightly concave. Walls 15, 15' convex, however, provided, of course, vertices B, C, B', C', etc. are stiff enought to transmit the bending moment of surfaces 14 to surfaces 15. During further depression vertices B and B', C and C', etc. may come to touch each other. This will result in a deflection of the line of deformation of the elastic element. During even further depression, surfaces 15' may touch each other at points A, A', causing the line of progression to become steeper still. It is clear that by his choice of the width of the connecting webs 9 and the width of the transverse web 10 the designer can determine the moment of contact and with it the line of deformation. The advantage is that the elastic properties of the bumper as a whole are reasonably independent of the ambient temperature and of that of the bumper itself. This is further elucidated in table 2 on page 5.

Figure 3:
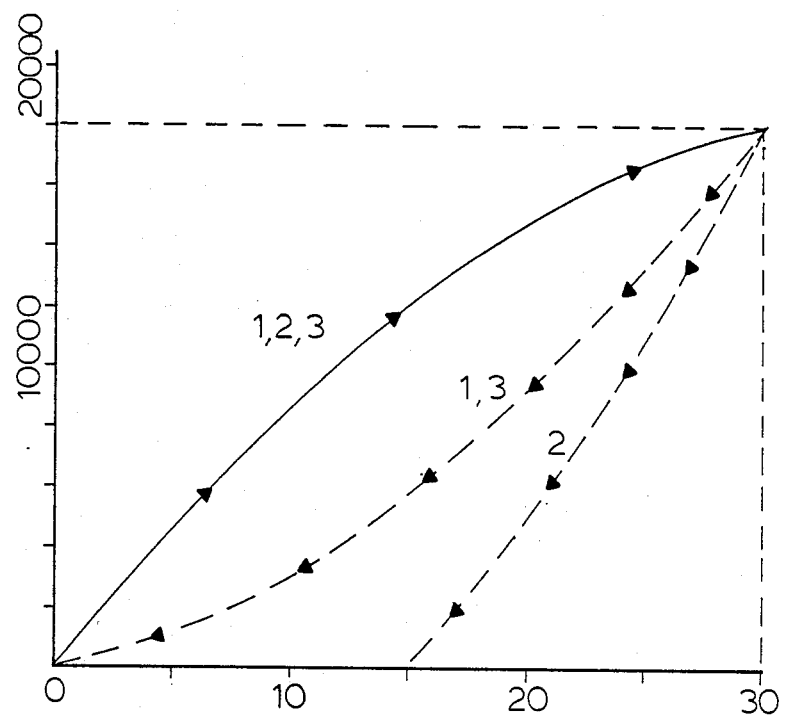
FIG. 3 is a graphical representation of the deformation under a certain load and of a springback of the elastic element subsequent to the removal of the load.

In FIG. 3 a force deflection diagram of a collision test is given. A lorry with a bumper according to the invention mounted on it was made to collide with a second lorry of the same mass and provided with a standard pendulum according to standard ECE 42 with masses of 1000 kg and a speed of 4 km/hr. The diagram shows, along the horizontal axis, the total measured force present in the suspension points of the bumper. Along the vertical axis in the diagram is shown the depression of the bumper in the contact area of the bumper with the pendulum calculated in respect of its suspension points. In table 1 a number of design data are given of the tested bumper according to the invention. Forces and displacements have been determined according to customary methods known to the person skilled in the art.

TABLE 1

Dimensions cross section box-shaped formation: 20 × 20 mm
Number of box-shaped formations in cross section of the elastic element: 2 × 2
Moment of bending resistance of the bearing member: $10^4$ mm$^3$ (in respect of axis // impact surface)
Distance between bearing member supports: 1000 mm
Material of the elastic element: LDPE, s.m. = 920 kg/m$^3$
M.I. 2.5
Wall thickness of box-shaped formations: 2 mm
Wall thickness of the connecting webs: 2 mm
Wall thickness of the transverse webs: 1 mm
Distance between box-shaped formations: 10 mm
Ambient temperature: +20° C.

Discussion of the results:

The diagram according to FIG. 3, lines 1 and 3, shows that the bumper according to the invention having the dimensions mentioned in table 2 springs back completely: consequently, there is no permanent deformation. When subjected to a load under the same conditions, the bumper known in the art, having the same outside dimensions, shows a permanent deformation subsequent to being subjected to a load of about 50% (see line 2 in the diagram).

The temperature independence of the elastic properties of the bumper according to the invention is significantly better than that of the bumper known in the art. Relevant data are mentioned in table 2.

TABLE 2

| | Bumper according to the invention | | comparative example | |
|---|---|---|---|---|
| ambient temperature °C. | total force [N] | maximum displacement [mm] | total force [N] | maximum displacement [mm] |
| +20° C. | 18,000 | 30 | 17,000 | 30 |
| −20° C. | 24,000 | 20 | 30,000 | 15 |

The above-mentioned values have been found in a collision test the same as mentioned on page 4.

In the elastic element for which the values mentioned in table 2 were found, the distance between the box-shaped formations had been reduced, however, to 8 mm, so that in the deformation vertices B, B' and C, C' and also the sides at A, A', etc. (see FIG. 2) touched each other.

FIG. 4 shows a bumper according to the invention wherein the box-shaped formations 4' extend in a direction perpendicular to that of the bearing member 2'. Also shown are connecting members 9' and transverse members 10' which interconnect the box-shaped formations 4'.

It should otherwise be noted that using an elastic element from so-called PUR foam with the same dimensions a complete springback can be achieved also. The disadvantage of such an element is that the costs are substantially higher than that of a bumper according to the invention.

I claim:

1. A bumper comprising a bearing member and an elastic deformable plastic element provided with an impact surface, which element is substantially comprised of a number of interconnected box-shaped formations the cross sections of which are regular polygons having an even number of sides and a length dimension extending along the longitudinal centerline thereof, said polygons being arranged parallel to the impact surface, the bumper being characterized in that near the midpoints of two opposite sides the box-shaped formations are connected with each other and with the impact surface by connecting webs extending lengthwise along the length dimension of the box-shaped formations and heightwise in a direction perpendicular to the impact surface and to the said sides.

2. A bumper according to claim 1, characterized in that the box-shaped formations have a virtually rectangular cross section.

3. A bumper according to claim 2, wherein the box-shaped formations also include interior edges which edges are connected together by transverse webs that extend perpendicularly to said connecting webs.

4. A bumper according to any one of claims 1-3, characterized in that the box-shaped formations extend in about the same direction as the bearing member.

5. A bumper according to any one of claims 1-3, characterized in that the box-shaped formations extend in a direction perpendicular to that of the bearing member.

6. An elongated bumper comprising a bearing member and an elastically deformable plastic element provided with an elongated impact surface, said bumper being comprised of a plurality of interconnected elongated box-shaped formations, the cross sections of each of said box-shaped formations being regular polygons and having a length dimension extending in the direction of the longitudinal centerline thereof, said polygons having an even number of interior sides and exterior sides which extend in a direction parallel to the impact surface, the midpoints of adjacent ones of said interior sides being connected to each other by connecting webs extending along the length of the box-shaped formations and oriented perpendicular to the impact surface and where the mid-points of the exterior sides of said box-shaped formations, adjacent said plastic element and said impact surface, are connected to said plastic element and said impact surface, respectively, by connecting webs extending along the box-shaped formations and oriented perpendicular to the impact surface so that upon impact against said impact surface the interior and exterior sides of each of said box-shaped formations are deformed toward each other.

* * * * *